(12) United States Patent  
Schuck (10) Patent No.: US 9,244,287 B2  
(45) Date of Patent: *Jan. 26, 2016

(54) OPTICAL SYSTEMS WITH COMPACT BACK FOCAL LENGTHS

(75) Inventor: Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 13/550,213

(22) Filed: Jul. 16, 2012

(65) Prior Publication Data

US 2013/0182227 A1 Jul. 18, 2013

Related U.S. Application Data

(63) Continuation-in-part of application No. 12/118,640, filed on May 9, 2008, now Pat. No. 8,727,536.

(60) Provisional application No. 61/507,959, filed on Jul. 14, 2011, provisional application No. 61/508,428, filed on Jul. 15, 2011.

(51) Int. Cl.
| | | |
|---|---|---|
| G03B 21/14 | (2006.01) | |
| G02B 27/26 | (2006.01) | |
| G02B 26/00 | (2006.01) | |
| H04N 13/04 | (2006.01) | |
| G02B 13/00 | (2006.01) | |
| G02B 13/16 | (2006.01) | |
| G02B 27/28 | (2006.01) | |
| G02B 27/00 | (2006.01) | |

(52) U.S. Cl.
CPC ............ G02B 27/26 (2013.01); G02B 13/0095 (2013.01); G02B 13/16 (2013.01); G02B 26/008 (2013.01); G02B 27/283 (2013.01); H04N 13/0434 (2013.01); H04N 13/0438 (2013.01); G02B 27/0025 (2013.01)

(58) Field of Classification Search
CPC ... H04N 9/315; H04N 9/3105; H04N 9/3197; G02B 27/283
USPC ............. 353/20, 30, 37, 38, 94, 98, 101, 102; 359/618, 619, 621, 631, 634, 599; 348/743–747

See application file for complete search history.

(56) References Cited

U.S. PATENT DOCUMENTS

| | | | |
|---|---|---|---|
| 4,792,850 A | 12/1988 | Liptoh | |
| 6,758,565 B1 * | 7/2004 | Cobb | .................... G02B 13/22 348/E5.139 |
| 7,448,756 B2 * | 11/2008 | Cho et al. | ........................ 353/37 |
| 7,528,906 B2 | 5/2009 | Robinson et al. | |
| 7,905,602 B2 | 3/2011 | Schuck et al. | |
| 7,959,296 B2 | 6/2011 | Cowan et al. | |

(Continued)

OTHER PUBLICATIONS

U.S. Appl. No. 12/118,640, filed May 9, 2008 to Miller Schuck et al.
U.S. Appl. No. 13/034,643, filed Feb. 24, 2011 to David A. Coleman et al.

(Continued)

*Primary Examiner* — Sultan Chowdhury
(74) *Attorney, Agent, or Firm* — Neil G. J. Mothew (57) ABSTRACT

Optical systems, such as 2-D and 3-D projection systems, may be configured to have a compact back focal length to allow for more compact projection lenses, lower throw ratios, improved contrast, or any combination thereof. In an embodiment, an optical system may include a relay element configured to form an intermediate image having a focal point proximate to a projection lens.

23 Claims, 6 Drawing Sheets

(56) References Cited

U.S. PATENT DOCUMENTS

2003/0072161 A1* 4/2003 Hough et al. ............... 362/293
2004/0156118 A1* 8/2004 Kawasaki ................... 359/676

OTHER PUBLICATIONS

Caldwell, J. Brian and Betensky, Ellis I., Compact, wide range, telecentric zoom lens for DMD projectors, IODC Technical Digest, p. 78 (1998).

* cited by examiner

OPTICAL SYSTEMS WITH COMPACT BACK FOCAL LENGTHS

CROSS-REFERENCE TO RELATED APPLICATIONS

This application is a non-provisional conversion of, and thus claims priority to, U.S. Provisional Patent Application No. 61/507,959, entitled "Compact polarization converting stereoscopic projection," filed Jul. 14, 2011, and U.S. Provisional Patent Application No. 61/508,428, entitled "Wide throw ratio polarization converting stereoscopic projection system," filed Jul. 15, 2011, and is a continuation-in-part of, and thus claims priority to, U.S. patent application No. 12/118,640, entitled "Polarization Conversion System and Method for Stereoscopic Projection," filed May 9, 2008, all of which are incorporated herein by reference in their entirety. Pursuant to 37 CFR 1.7(b), this application is hereby filed on Monday, Jul. 16, 2012, which is the next succeeding business day following the one year anniversary of the filing of Prov. Pat. App. Nos. 61/507,959 and 61/508,428.

TECHNICAL FIELD

The present disclosure generally relates to optical systems, and more specifically, to two dimensional and three dimensional projection technologies and components.

BACKGROUND

Projection technologies may include functionality to deploy, view, project and/or display three dimensional ("3D") content. Active and passive polarization converting stereoscopic projection systems have been disclosed in commonly-owned U.S. Pat. Nos. 7,905,602 & 7,959,296 and U.S. patent application Ser. Nos. 12/118,640 and 13/034,643, all of which are hereby incorporated by reference in their entirety.

BRIEF SUMMARY

According to an exemplary embodiment, an optical system may comprise an imaging source operable to output light, a relay element operable to receive the light from the imaging source, and a projection lens. The relay element may be configured to form an intermediate image having a focal point proximate to an entry surface of the projection lens, the focal point of the intermediate image and the entry surface of the projection lens defining a back focal length therebetween. The projection lens may be operable to project the intermediate image.

According to another exemplary embodiment, an optical system may comprise an imaging source operable to output light, a relay element operable to receive the light from the imaging source, a polarizing beam splitter assembly, and first and second projection lenses disposed proximate to first and second exit ports of the polarizing beam splitter assembly, respectively. The relay element may be configured to form a first intermediate image having a focal point between the first exit port of the polarizing beam splitter assembly and the first projection lens, the focal point of the first intermediate image and an entry surface of the first projection lens defining a first back focal length therebetween. The relay element may be configured to form a second intermediate image having a focal point between the second exit port of the polarizing beam splitter assembly and the second projection lens, the focal point of the second intermediate image and an entry surface of the second projection lens defining a second back focal length therebetween. The first and second projection lenses may be operable to project the first and second intermediate images, respectively.

According to another exemplary embodiment, an optical system may comprise a an imaging source operable to output light, a relay element operable to receive the light from the imaging source, a projection lens, and a polarization conversion system. The relay element may be configured to form an intermediate image having a focal point proximate to an entry surface of the projection lens, the focal point of the intermediate image and entry surface of the projection lens defining a back focal length therebetween. The projection lens may be operable to project the intermediate image through the polarization conversion system, which may be operable to convert the light comprising the intermediate image to a single polarization state and output converted light along first and second optical paths.

BRIEF DESCRIPTION OF THE DRAWINGS

Embodiments are illustrated by way of example in the accompanying figures, in which like reference numbers indicate similar parts, and in which.

DETAILED DESCRIPTION

An increased demand for deploying, viewing, projecting and/or displaying three dimensional ("3D") content may drive need for enhanced performance of projection technology and lower cost. Size of the projection lens and certain optical components, such as the polarization conversion system (PCS) of a projection system, may affect both performance and cost. Large projection lenses and PCS may limit contrast performance and throw ratio. Throw ratio may be defined as a projector to screen distance divided by the screen width and may be limited resulting from practical optical component size limitations. Cost of the projection system may increase due to the resulting costs of the larger components.

The size of the polarization converting system (PCS) may be determined by at least the appropriate throw ratio, the projection lens exit pupil location, and the size of the projection lens exit pupil. The exit pupil size may be determined by the projection lens f-number (or numerical aperture) and throw ratio via the optical invariant. Factors that may affect the size of a projection lens and certain optical components of a projection system includes, but not limited to, the appropriate throw ratio, f-number, and back focal length (BFL). The throw ratio may be determined by the theater geometry. The f-number may be determined by the panel and illumination optics.

The BFL may be determined by the system architecture. Projectors utilizing spatial light modulators, for example DLP micro-mirror panels, may employ planar glass optics between the panel and projection lens for various reasons, including illumination and color management. Projection lenses for these projectors may have long BFLs to allow space for the illumination and color management optics between the panel and lens.

But a long back focal length (BFL) through illumination and color management optics in a PCS projection system may increase the size of projection lens and other optical components. A large BFL configuration may compel the lens to have a larger envelope than a lens with a smaller BFL configuration. The larger envelope of the large BFL lens, in turn, may position the exit pupil of the lens further away from the front surface vertex of the lens. In this example, the illumination footprint of light emerging from the lens, may be large and may affect the size of the PCS components that follow.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

An exemplary embodiment of the present disclosure may include the use of a relay element, such as one or more relay lens, to form an intermediate image having a focal point proximate to a projection lens, thereby allowing for a relatively short BFL. An exemplary embodiment of the present disclosure may include a relay element, at least one short BFL projection lens, and a polarizing beam-splitter (PBS) assembly. In such an embodiment, the size of the projection lens and PCS may be reduced, and the uniformity and overall value of the system contrast may be increased.

Figure 1A:
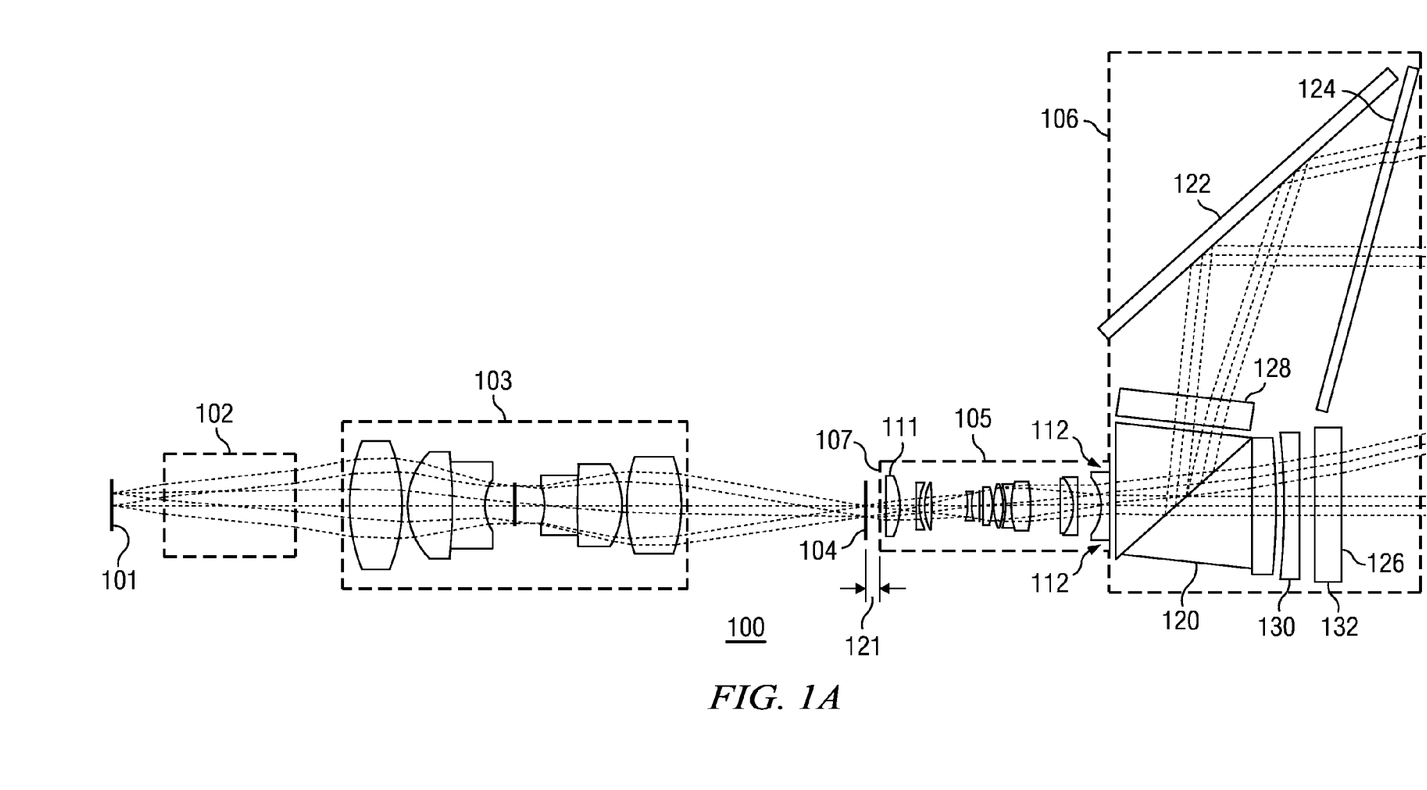
FIG. 1A is a schematic diagram illustrating an embodiment of an optical system, in accordance with the present disclosure.

FIG. 1 is a schematic diagram illustrating one embodiment of an optical system 100. The optical system 100 may include an imaging source 101 operable to output light and a relay element 103 operable to receive the light from the imaging source 101 either directly or indirectly. The imaging source 101 may include an illumination source, such as laser illumination light, a lamp source, or a source comprising light emitting diodes. In an embodiment, the image source 101 may comprise any imaging panel known in the art, including, for example a spatial modulator or a reflective micromirror device. In an embodiment, an optical element 102 may be disposed between the imaging source 101 and the relay element 103 for managing the illumination or color of light to or from the imaging source 101. The optical system 100 may further include a projection lens 105 operable to project an intermediate image 104. As shown in FIG. 1, the relay element 103 may image the image source 101 through the illumination and color management optics 102 and may create the intermediate real image 104 of the imaging source 101. In an exemplary embodiment, the relay element 103 is configured to form the intermediate image 104 such that its focal point is proximate to an entry surface 107 of the projection lens 105. The focal point of the intermediate image 104 and entry surface 107 of the projection lens 105 may define a back focal length 108 therebetween.

The projection lens 105 may be located after the intermediate image 104 and may project the light or image toward a screen (not shown). The projection lens 105 may be various types of lenses, such as, but not limited to, a zoom lens, a fixed focal length lens, etc. In an embodiment, an active switching or passive polarization component PCS 106 may be located after the projection lens 105. By utilizing the relay element 103 and a projection lens 105 that is relatively short, the projection lens entrance pupil 111 may be moved closer to the entrance port 112 of the PCS 106. This configuration may allow for a smaller illumination footprint as the light passes through the two optical paths of the PCS 106. The PCS 106 therefore may service wider throw ratios, or alternatively, the PCS 106 may be reduced in size for a given throw ratio.

The relay element 103 may include any relay lens known in the art, including the relay lens described in U.S. Pat. No. 7,317,578, which is hereby incorporated by reference in its entirety. The projection lens 105 may include any projection lens known in the art, including the projection lenses described in J. Brian Caldwell and Ellis I. Betensky, *Compact, wide range, telecentric zoom lens for DMD projectors*, IODC Technical Digest, p. 78 (1998), which is hereby incorporated by reference in its entirety. In an embodiment, the relay element 103 and projection lens 105 may be optimized independently for aberration control without regard to the other lens' performance. In an embodiment, the two lenses may be designed such that opposing aberrations in the two lenses compensate or substantially null the overall aberrations. Additionally, the relay element 103 and projection lens 105 may be designed for higher f-number and higher transmission when lasers are used as the illumination source in the imaging source 101. In an embodiment, the PCS 106 may include anti-reflection elements, mirrors, or polarizing beam-splitter coatings optimized for performance with narrowband laser illumination.

In one embodiment, the optical system 100 may be configured for projecting stereoscopic imagery. The relay element 103 may have a long back focal length for imaging the imaging source 101 through illumination and color management optics 102, and the projection lens 105 may have a short back focal length for reducing the distance between the exit pupil and exit surface vertex of the projection lens 105. The polarization conversion system 106 may convert randomly or partially polarized light to a single polarization state in two separate optical paths for overlay on a screen (not shown).

The optical system 100 may be operated with actively modulated PCSs or passive component PCSs. The PCS 106 may be configured as described in the commonly-owned U.S. patent application Ser. No. 12/118,640, which is hereby incorporated by reference. As shown in FIG. 1, the PCS 106 may include a polarizing beam splitter 120 operable to split light received from the projection lens 105 into two paths. The PCS 106 may also include a reflector 122 to direct light along a first path towards the same direction as the second light path. The PCS 106 may include lenses 130 and 132 configured to substantially match the projected image magnification between the first and second optical paths. In an embodiment, the PCS 106 may further include polarization elements 126 and 128 disposed in the first and second light paths, respectively, and they may each comprise a modulator (not shown) operable to switchably modulate light passing therethrough and time-sequentially output light of substantially orthogonal polarization states. The polarization element 128 may further include polarizers (not shown) and a polarization rotator (not shown) optically preceding the modulator of the polarization element 128. The rotator of the polarization element 128 may be operable to rotate the polarization state in the second path to approximately and substantially match the polarization state in the first path. In an embodiment, the polarization modulators of the polarization elements 126 and 128 are operable to sequentially output light of first and second orthogonal states towards a screen (not shown), thereby providing stereoscopic images.

In an embodiment, the modulators of the polarization elements 126 and 128 may be replaced by one single polarization modulator (not shown) operable to modulate both the first and second light paths. In an embodiment, the polarization modulators 128 and 126 may each be an active ZScreen as disclosed in the commonly-owned U.S. Pat. No. 4,792,850, which is hereby incorporated by reference. In an embodiment, the polarization modulators 128 and 126 may each be a polarization switch that was disclosed in the commonly-owned U.S. Pat. No. 7,528,906, which is hereby incorporated by reference.

In an embodiment, the modulator of the polarization element 128 may be configured to output light of substantially orthogonal circular polarization states. In such an embodiment, the polarization element 128 may also include a quarter wave plate (not shown) optically following the modulator of the polarization element 128 to create substantially orthogonal linear polarization states from the circularly polarized light emerging from the polarization element 128. The linear polarization states accumulate lower phase upon reflection at mirror 122, and may be then converted back to circular polarization states by a quarter-wave retarder 124 of the PCS 106. This allows for a higher contrast system when the polarization element 128 is located at the exit port of the PBS assembly 120. In another embodiment, the polarization element 128 may be moved to the location of quarter wave retarder 124, which along with the quarter wave plate of the polarization element 182 may be eliminated, as described in the commonly-owned U.S. patent application Ser. No. 12/118,640.

Figure 1B:
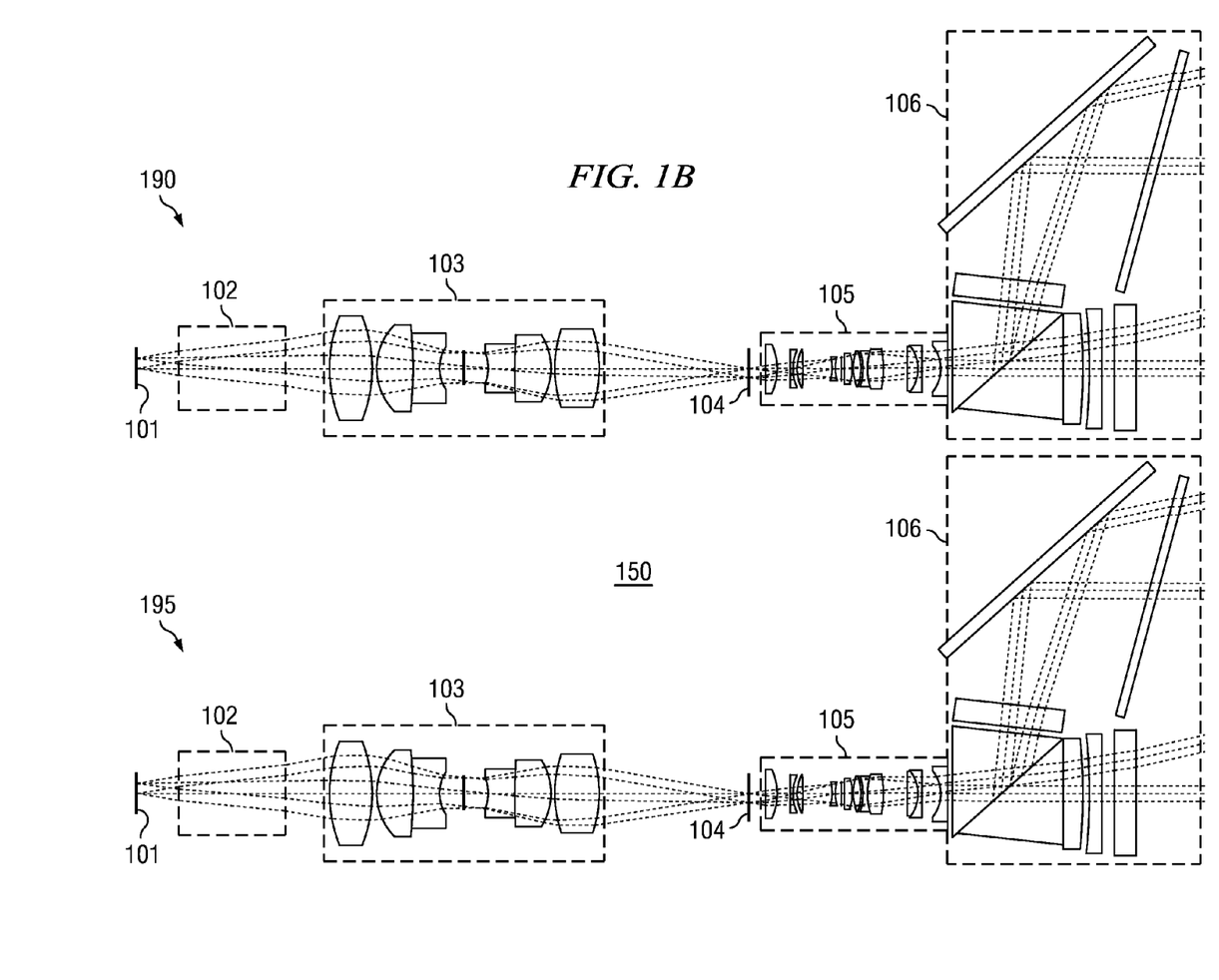
FIG. 1B is a schematic diagram illustrating an embodiment of a dual-projector optical system, in accordance with the present disclosure.

FIG. 1B is a schematic diagram illustrating an exemplary dual-projector optical system 150. The optical system 150 comprises two projection subsystems 190, 195, and each projection subsystem 190, 195 may have the architecture similar to that of the optical system 100. Such a dual-projector system may allow for at least one of the following: 1) an increase in brightness for a given screen size; 2) an increase screen size for a given brightness; 3) some combination of 1) and 2); or 4) a stitching of multiple images on-screen to create a higher resolution image. In an embodiment, PCS's 106 may be replaced by passive polarizers and/or retarders, allowing the projection subsystem 190 to substantially project a first state of polarization, while the second projection subsystem 195 projects a second, substantially orthogonal state of polarization.

Figure 2A:
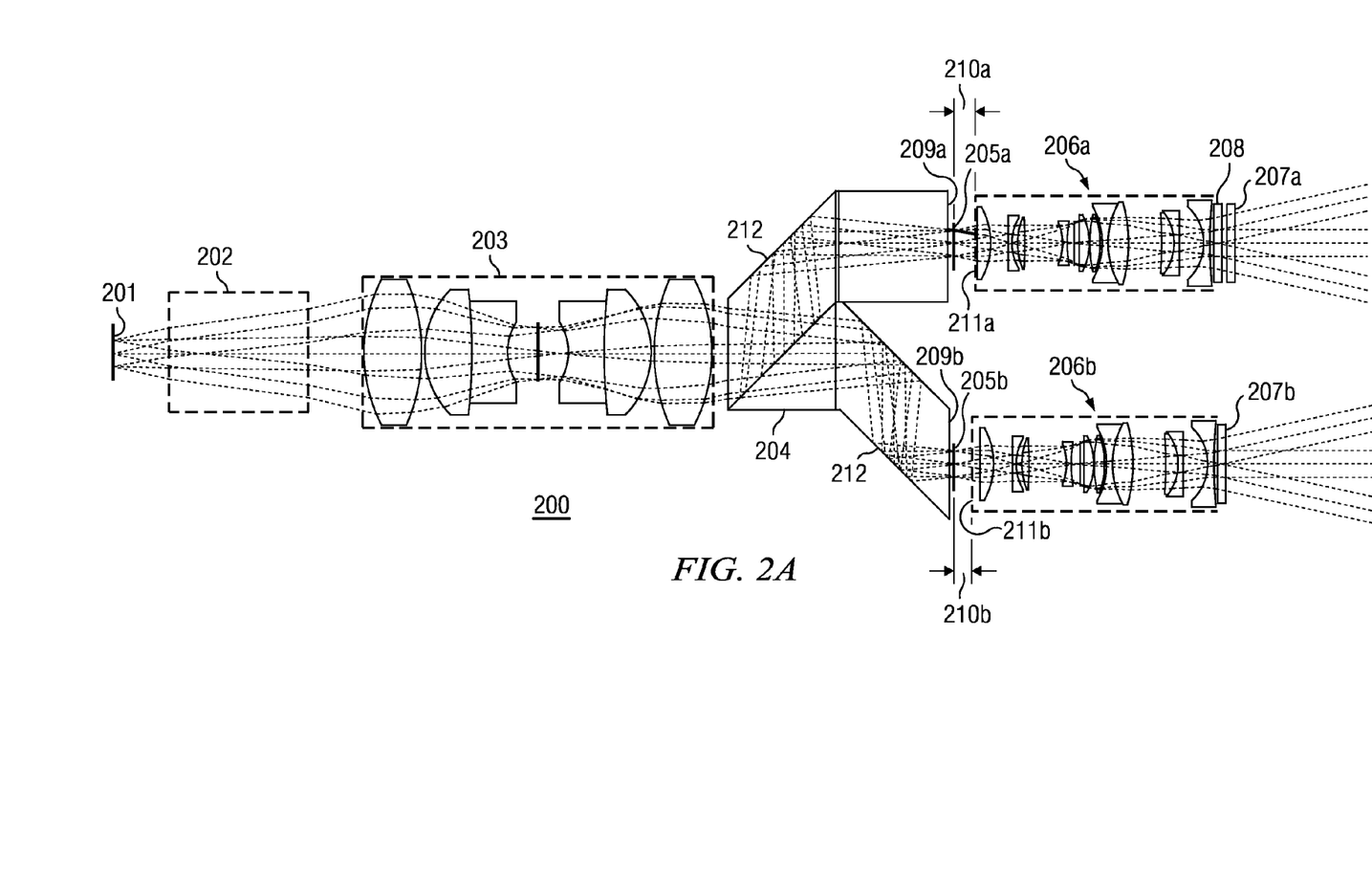
FIG. 2A is a schematic diagram illustrating an embodiment of an optical system having a polarization beam splitter assembly, in accordance with the present disclosure.

FIG. 2A is a schematic diagram illustrating one embodiment of an exemplary optical system 200. The optical system 200 may include an imaging source 201 operable to output light and a relay element 203 operable to receive the light from the imaging source 201 either directly or indirectly. The imaging source 201 may include an illumination source, such as laser illumination light, a lamp source, or a source comprising light emitting diodes. In an embodiment, the image source 201 may comprise any imaging panel known in the art, including, for example a spatial modulator or a reflective micromirror device. In an embodiment, an optical element 202 may be disposed between the imaging source 201 and the relay element 203 for managing the illumination or color of an image in the light from the imaging source 201.

The optical system 200 may further include a polarizing beam splitter assembly 204 and first and second projection lenses 206a, 206b disposed proximate to first and second exit ports 209a, 209b of the polarizing beam splitter assembly 204, respectively. As shown in FIG. 2A, the relay element 203 may image the image source 201 through the illumination and color management optics 202 and may create the intermediate real images 205a, 205b of the imaging source 201. In an exemplary embodiment, the relay element 203 is configured to form the first intermediate image 205a such that its focal point is between the first exit port 209a of the polarizing beam splitter assembly 204 and the first projection lens 206a. The focal point of the first intermediate image 205a and an entry surface 211a of the first projection lens 206a may define a back focal length 210a therebetween. In an exemplary embodiment, the relay element 203 is configured to also form the second intermediate image 205b such that its focal point is between the second exit port 209b of the polarizing beam splitter assembly 204 and the second projection lens 206b. The focal point of the second intermediate image 205b and an entry surface 211b of the second projection lens 206b may define a back focal length 210b therebetween.

The PBS assembly 204 may be operable to receive light from the relay element 203 and output substantially orthogonally polarized light onto at least two distinct optical paths. As shown in FIG. 2A, the assembly 204 may include reflecting surfaces 212 for redirecting the two optical paths such that they emerge approximately parallel to one another. One path may contain an odd number of reflecting surfaces optically following a polarizing beam splitter 204a while the other may contain an even number of reflecting surfaces optically following the polarizing beam splitter 204a.

Referring to FIG. 2A, in an embodiment, the projection lenses 206a, 206b may be located after the intermediate images 205a, 205b and project the respective individual images toward a screen (not shown). The projection lenses 206a, 206b may be any type of suitable lenses such as, but not limited to, zoom lenses, fixed focal length lenses, etc. Active switching or passive polarization components 207a, 207b may optically follow the projection lenses 206a, 206b, respectively, for modulating or passively altering the polarization state emerging from each projection lens 206a, 206b. A rotator 208 may be disposed in one optical path between one of the exit ports 209a, 209b and polarization component 207a, 207b, respectively. The rotator 208 may rotate the polarization state in a first path to approximately and substantially match the polarization state in a second path. In an embodiment, the polarization components 207a, 207b may each comprise a passive polarizer or retarder. In another embodiment, polarization components 207a, 207b may each comprise a polarization modulator operable to be actively switched to output light of orthogonal polarizations. Such an embodiment may be used to provide stereoscopic imaging.

It is to be appreciated that by configuring the relay element 203 to locate the focal points of the intermediate images 205a, 205b proximate to and between the exit ports 209a, 209b of the PBS assembly 204 and the projection lenses 206a, 206b, respectively, a shorter BFL may be achieved to allow for more compact projection lenses 206a, 206b, which may result in a more compact and less costly system. Furthermore, the compact projection lens 206a, 206b may allow for a smaller illumination footprint as the light passes through the polarization components 207a, 207b, and 208, thus reducing the size of these components. Generally, the smaller polarization components may be, the easier to manufacture. And with smaller components, wider projection angles and lower throw ratios may be realized.

Figure 2B:
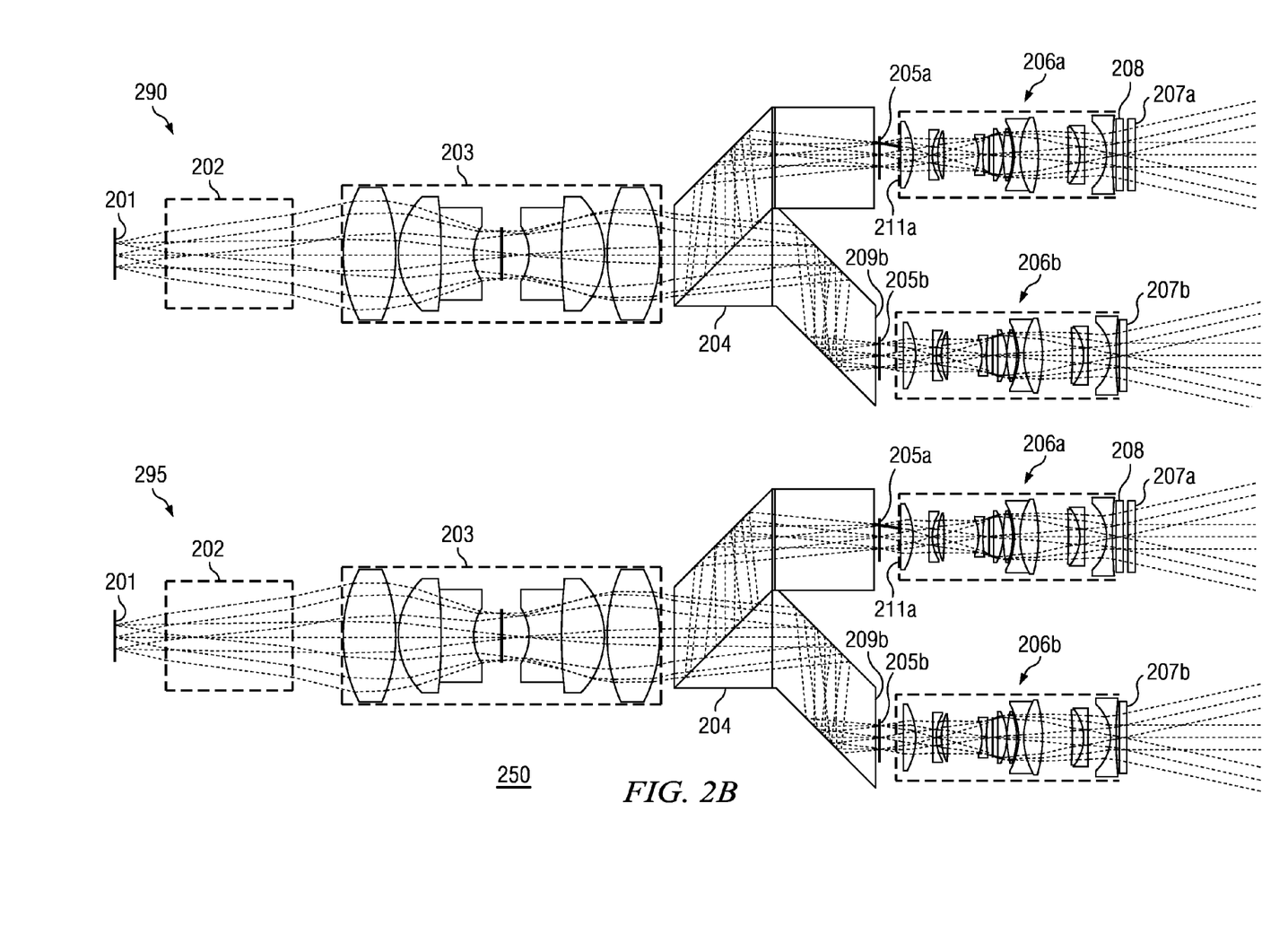
FIG. 2B is a schematic diagram illustrating an embodiment of a dual-projector, optical system having a polarization beam splitter assembly, in accordance with the present disclosure.

FIG. 2B is a schematic diagram illustrating an exemplary dual-projector optical system 250. The optical system 250 comprises two projection subsystems 290, 295, and each projection subsystem 290, 295 may have an architecture similar to that of the optical system 200. Such a dual-projector system may allow for at least one of the following: 1) an increase in brightness for a given screen size; 2) an increase screen size for a given brightness; 3) some combination of 1) and 2); or 4) a stitching of multiple images on-screen to create a higher resolution image. In an embodiment, the polarization components 207a, 207b may each comprise a passive polarizer and/or a retarder, allowing the projection subsystem 290 to substantially project a first state of polarization, while the second projection subsystem 295 projects a second, substantially orthogonal state of polarization.

Figure 3A:
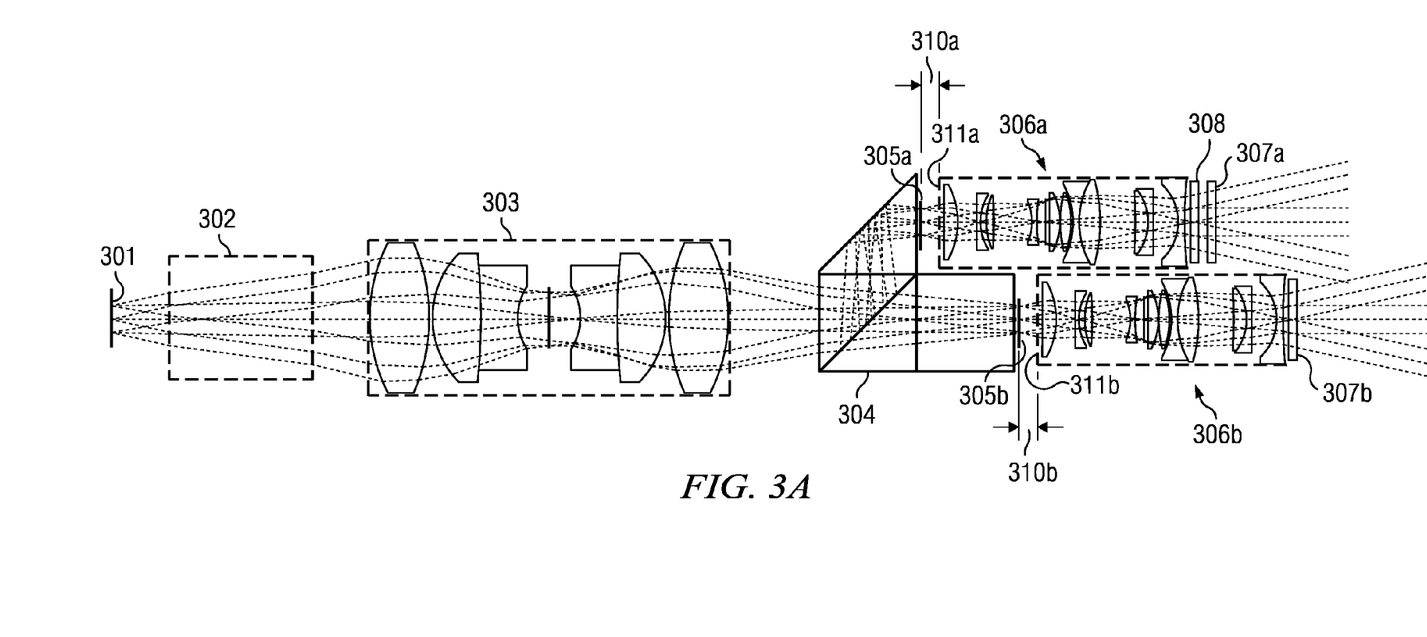
FIG. 3A is a schematic diagram illustrating another embodiment of an optical system having a polarization beam splitter assembly, in accordance with the present disclosure.

FIG. 3A is a schematic diagram illustrating one embodiment of an optical system 300. Similar to optical system 200, the optical system 300 may include an imaging source 301 operable to output light and a relay element 303 operable to receive the light from the imaging source 301 either directly or indirectly. The imaging source 301 may include an illumination source, such as laser illumination light, a lamp source, or a source comprising light emitting diodes. In an embodiment, the image source 301 may comprise any imaging panel known in the art, including, for example a spatial modulator or a reflective micromirror device. In an embodiment, an optical element 302 may be disposed between the imaging source 301 and the relay element 303 for managing the illumination or color of an image in the light from the imaging source 301.

The optical system 300 may further include a polarizing beam splitter assembly 304 and first and second projection lenses 306a, 306b disposed proximate to first and second exit ports 309a, 309b of the polarizing beam splitter assembly 304, respectively. As shown in FIG. 3A, the relay element 303 may image the image source 301 through the illumination and color management optics 302 and may create the intermediate real images 305a, 305b of the imaging source 301. In an exemplary embodiment, the relay element 303 is configured to form the first intermediate image 305a such that its focal point is between the first exit port 309a of the polarizing beam splitter assembly 304 and the first projection lens 306a. The focal point of the first intermediate image 305a and an entry surface 311a of the first projection lens 306a may define a back focal length 310a therebetween. In an exemplary embodiment, the relay element 303 is configured to also form the second intermediate image 305b such that its focal point is between the second exit port 309b of the polarizing beam splitter assembly 304 and the second projection lens 306b. The focal point of the second intermediate image 305b and an entry surface 311b of the second projection lens 306b may define a back focal length 310b therebetween. In an embodiment, the projection lenses 306a, 306b may be located after the intermediate images 305a, 305b and project the respective individual images toward a screen (not shown).

As shown in FIG. 3A, a first optical path of the PBS assembly 304 may include one reflection optically following a polarizing beam splitter 304a, and a second path may include no reflections. In an embodiment, the reflection in the first path may be provided by a prism 304b disposed on the top of the polarizing beam splitter 304. One advantage of this embodiment may be that less glass is employed in the PBS assembly 304 when compared to the PBS assembly 204 of FIG. 2. In an embodiment, a polarization rotator 308 may be disposed in one path and polarization components 307a and 307b may be disposed in both paths follow the projection lenses 306a, 306b. In an embodiment, the polarization components 307a, 307b may each comprise a passive polarizer or retarder. In another embodiment, polarization components 307a, 307b may each comprise a polarization modulator operable to be actively switched to output light of orthogonal polarizations. Such an embodiment may be used to provide stereoscopic imaging.

Figure 3B:
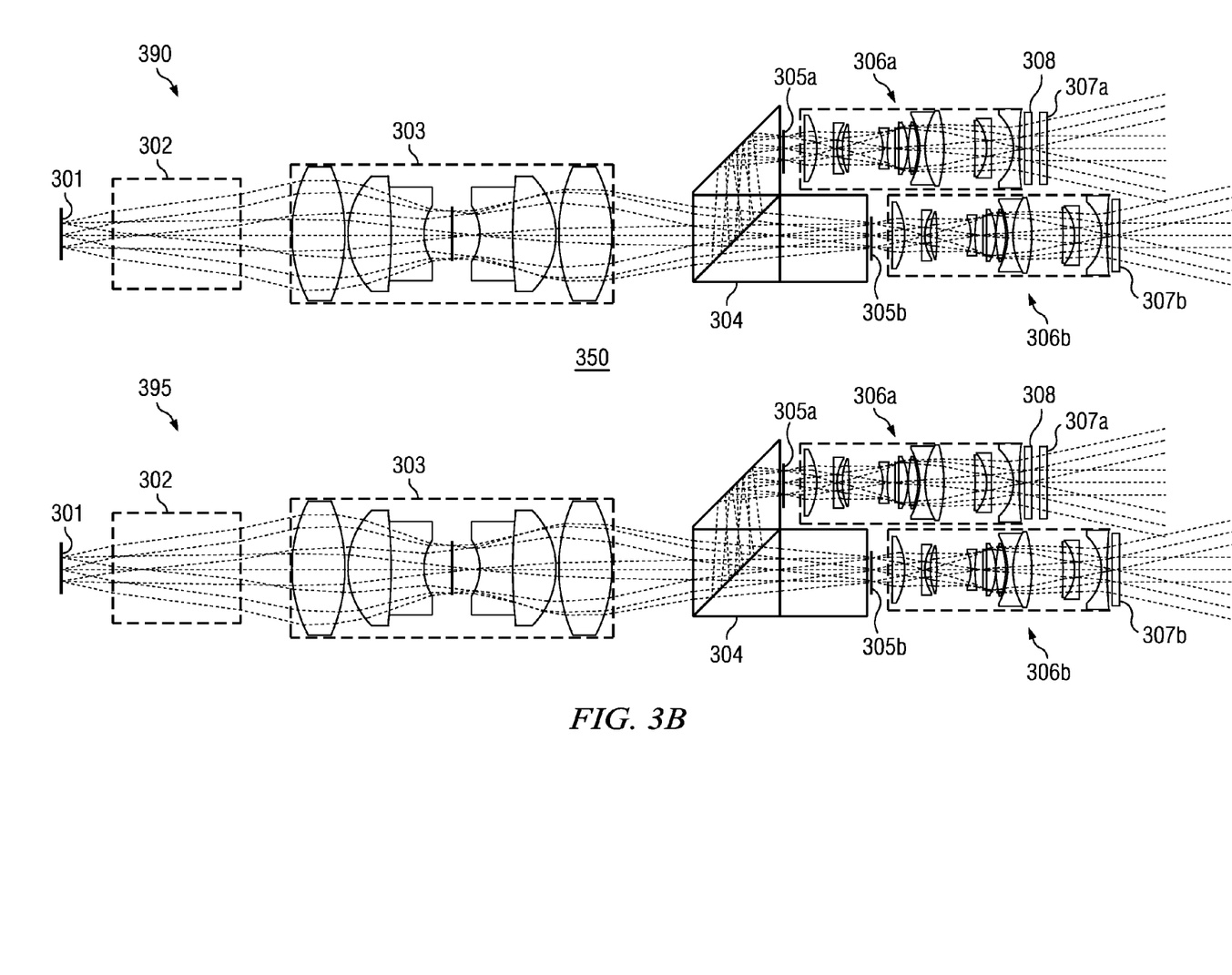
FIG. 3B is a schematic diagram illustrating another embodiment of a dual-projector, optical system having a polarization beam splitter assembly, in accordance with the present disclosure.

The system 300 may include actively modulated PCSs or passive component PCSs. In both cases, either active or passive, multiple PCSs may be used on multiple projectors. FIG. 3B is a schematic diagram illustrating an exemplary dual-projector optical system 350. The optical system 350 comprises two projection subsystems 390, 395, and each projection subsystem 390, 395 may have an architecture similar to that of the optical system 300. Such a dual-projector system may allow for at least one of the following: 1) an increase in brightness for a given screen size; 2) an increase screen size for a given brightness; 3) some combination of 1) and 2); or 4) a stitching of multiple images on-screen to create a higher resolution image. In an embodiment, the polarization components 307a, 307b may each comprise a passive polarizer and/or a retarder, allowing the projection subsystem 390 to substantially project a first state of polarization, while the second projection subsystem 395 projects a second, substantially orthogonal state of polarization.

It should be noted that embodiments of the present disclosure may be used in a variety of optical systems and projection systems to allow for a compact back focal length, which allows for more compact projection lenses, lower throw ratios, improved contrast, or any combination thereof. The embodiment may include or work with a variety of projectors, projection systems, cameras, image capture devices, optical components, computer systems, processors, self-contained projector systems, visual and/or audiovisual systems and electrical and/or optical devices. Aspects of the present disclosure may be used with practically any apparatus related to optical and electrical devices, optical systems, capture systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than approximately one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An optical system, comprising:
   an imaging source operable to output light;
   a relay element operable to receive the light from the imaging source; and
   a projection lens;
   wherein the relay element is configured to form an intermediate image having a focal point proximate to an entry surface of the projection lens, the focal point of the intermediate image and the entry surface of the projection lens defining a back focal length therebetween; and
   wherein the projection lens is operable to project the intermediate image.

2. The optical system of claim 1, wherein the optical system further comprises a polarization conversion system operable to convert the light comprising the intermediate image to substantially a single polarization state and output converted light along first and second optical paths.

3. The optical system of claim 1, further comprising a polarizing beam splitter assembly and a second projection lens, wherein the projection lens and the second projection lens are disposed proximate to first and second exit ports of the polarizing beam splitter assembly, respectively, and wherein the relay element is configured to form a second intermediate image having a focal point proximate to an entry surface of the second projection lens, the focal point of the second intermediate image and the entry surface of the projection lens defining a back focal length therebetween.

4. The optical system of claim 1, wherein the relay element is configured to compensate for aberration.

5. The optical system of claim 1, wherein the projection lens is configured to compensate for aberration.

6. The optical system of claim 1, wherein the relay element and the projection lens are configured to cooperate to compensate an overall aberration.

7. The optical system of claim 1, wherein the imaging source comprises a spatial light modulator.

8. The optical system of claim 1, wherein the imaging source comprises a reflecting micromirror device.

9. The optical system of claim 1, wherein the imaging source is illuminated by laser light source, a lamp source, or a source comprising light emitting diodes.

10. The optical system of claim 1, wherein the projection lens comprises a zoom lens or a fixed focal length lens.

11. The optical system of claim 1, wherein the imaging source is a first imaging source, the relay element is a first relay element, and the projection lens is a first projection lens, and wherein the first imaging source, the first relay element, and the first projection lens are comprised in a first projection subsystem, and the optical system further comprises a second projection subsystem comprising:
   a second imaging source operable to output light;
   a second relay element operable to receive the light from the second imaging source; and
   a second projection lens;
   wherein the second relay element is configured to form a second intermediate image having a focal point proximate to an entry surface of the second projection lens, the focal point of the second intermediate image and the entry surface of the second projection lens defining a back focal length therebetween; and
   wherein the second projection lens is operable to project the second intermediate image.

12. An optical system, comprising:
   an imaging source operable to output light;
   a relay element operable to receive the light from the imaging source;
   a polarizing beam splitter assembly; and
   first and second projection lenses disposed proximate to first and second exit ports of the polarizing beam splitter assembly, respectively;
   wherein the relay element is configured to form a first intermediate image having a focal point between the first exit port of the polarizing beam splitter assembly and the first projection lens, the focal point of the first intermediate image and an entry surface of the first projection lens defining a first back focal length therebetween;
   wherein the relay element is configured to form a second intermediate image having a focal point between the second exit port of the polarizing beam splitter assembly and the second projection lens, the focal point of the first intermediate image and an entry surface of the second projection lens defining a second back focal length therebetween;
   wherein the first and second projection lenses are operable to project the first and second intermediate images, respectively.

13. The optical system of claim 12, wherein the polarizing beam splitter assembly comprises:
   a polarizing beam splitter;
   an odd number of reflectors optically following the polarizing beam splitter in a first output light path; and
   an even number of reflectors optically following the polarizing beam splitter in a second output light path.

14. The optical system of claim 12, wherein the polarizing beam splitter assembly comprises:
   a polarizing beam splitter;
   a single reflector optically following the polarizing beam splitter in a first output light path; and
   no reflector optically following the polarizing beam splitter in a second output light path.

15. The optical system of claim 12, further comprising first and second polarization elements optically following the first and second projection lens, respectively, and a polarization rotator disposed between the first exit port of the polarization beam splitter assembly and the first polarization element.

16. The optical system of claim 15, wherein the first and second polarization elements each comprise a passive polarizer or retarder.

17. The optical system of claim 15, wherein the first and second polarization elements each comprise a polarization modulator operable to output light of orthogonal polarizations.

18. The optical system of claim 12, wherein the imaging source is a first imaging source, the relay element is a first relay element, and the polarizing beam splitter assembly is a first polarization beam splitter assembly, and wherein the first imaging source, the first relay element, the first and second projection lenses, and the first polarization beam splitter assembly are comprised in a first projection subsystem, and the optical system further comprises a second projection subsystem comprising:

a second imaging source operable to output light;
a second relay element operable to receive the light from the second imaging source;
a second polarizing beam splitter assembly; and
third and forth projection lenses disposed proximate to first and second exit ports of the second polarizing beam splitter assembly, respectively;
wherein the second relay element is configured to form a third intermediate image having a focal point between the first exit port of the second polarizing beam splitter assembly and the third projection lens, the focal point of the third intermediate image and an entry surface of the third projection lens defining a third back focal length therebetween;
wherein the second relay element is configured to form a fourth intermediate image having a focal point between the second exit port of the second polarizing beam splitter assembly and the fourth projection lens, the focal point of the fourth intermediate image and an entry surface of the fourth projection lens defining a fourth back focal length therebetween;
wherein the third and fourth projection lenses are operable to project the third and fourth intermediate images, respectively.

19. An optical system, comprising:
an imaging source operable to output light;
a relay element operable to receive the light from the imaging source; and
a projection lens; and
a polarization conversion system;
wherein the relay element is configured to form an intermediate image having a focal point proximate to an entry surface of the projection lens, the focal point of the intermediate image and entry surface of the projection lens defining a back focal length therebetween; and
wherein the projection lens is operable to project light comprising the intermediate image through the polarization conversion system, the polarization conversion system being operable to convert the light comprising the intermediate image to substantially a single polarization state and output converted light along first and second optical paths.

20. The optical system of claim 19, wherein the polarization conversion system comprises a polarizing beam splitter operable to split light received from the projection lens into first and second light paths and first and second polarization elements disposed in the first and second light paths, respectively, and wherein the first and second polarization elements are each operable to switchably modulate light passing therethrough and output light of substantially orthogonal polarization states.

21. The optical system of claim 20, wherein the polarization conversion system further comprises a reflector to direct light along a first path towards a same direction as the second light path.

22. The optical system of claim 20, wherein the first and second polarization element are operable to sequentially output light of the substantially orthogonal polarization states, thereby providing stereoscopic images.

23. The optical system of claim 19, wherein the imaging source is a first imaging source, the relay element is a first relay element, the projection lens is a first projection lens, and the polarization conversion system is a first polarization conversion system, and wherein the first imaging source, the first relay element, the first projection lens, and the first polarization conversion system are comprised in a first projection subsystem, and the optical system further comprises a second projection subsystem comprising:

a second imaging source operable to output light;
a second relay element operable to receive the light from the second imaging source; and
a second projection lens; and
a second polarization conversion system;
wherein the second relay element is configured to form a second intermediate image having a focal point proximate to an entry surface of the second projection lens, the focal point of the second intermediate image and the entry surface of the second projection lens defining a back focal length therebetween; and
wherein the second projection lens is operable to project light comprising the second intermediate image through the second polarization conversion system, the second polarization conversion system being operable to convert the light comprising the second intermediate image to substantially a single polarization state and output converted light along first and second optical paths;
wherein the second polarization conversion system comprises a second polarizing beam splitter operable to split light received from the second projection lens into third and fourth light paths and third and fourth polarization elements disposed in the third and fourth light paths, respectively, and wherein the third and fourth polarization elements are each operable to switchably modulate light passing therethrough and sequentially output light of substantially orthogonal polarization states, thereby providing stereoscopic images.

* * * * *